UNITED STATES PATENT OFFICE.

ALBERT HENNING, OF LONDON, ENGLAND.

NON-FLAMMABLE VOLATILE LIQUID.

1,386,497.  Specification of Letters Patent.  Patented Aug. 2, 1921.

No Drawing.  Application filed January 5, 1921. Serial No. 435,176.

*To all whom it may concern:*

Be it known that I, ALBERT HENNING, a British subject, resident of 120 Harrow road, Leytonstone, London, E. 11, England, have invented certain new and useful Improvements in Non-Flammable Volatile Liquid, of which the following is a specification, such as will enable others skilled in the art to which it appertains to make and use the same.

The invention relates to a non-flammable volatile liquid for use as a refrigerating agent or as a solvent, or any other suitable applications in the arts and may be broadly described as consisting of a mixture containing methyl chlorid with methyl bromid.

It is commonly stated that methyl chlorid is only slightly combustible but I have found this statement to be incorrect as methyl chlorid is easily ignited. From experiments made I find methyl bromid does not burn and in fact is sufficiently non-combustible to extinguish fire, and may be mixed with methyl chlorid without detracting materially from its properties.

According to my invention I employ a mixture containing methyl bromid and methyl chlorid, and I have found that the proportions can be varied to produce different degrees of non-flammability, ranging from a material which would quench a flame, and containing a liberal percentage of methyl bromid, to a mixture richer in methyl chlorid which will just ignite on application of a flame.

As a refrigerating agent it is important that the mixture should not separate readily during vaporization. A special feature of my invention deals with this point.

I have found that the above mixtures vaporize substantially as a single liquid and the amount of separation during the vaporization under ordinary practical conditions would not permit of the development of inflammable properties at any stage of the evaporation.

As an example of the invention the following may be cited, although I do not confine myself to these proportions, and may employ any other suitable proportions.

A mixture of 100 parts methyl chlorid, by volume, and 100 parts of methyl bromid, by volume, will boil at about minus thirteen degrees centigrade and a mixture of this composition may be vaporized, and during the process inflammable properties are not found, either in the vapor or in the residual liquid.

The liquid according to my invention is substantially neutral and has no action on ordinary constructional metals such as would be used for machines or containers, whereas pure methyl bromid, in addition to being expensive has a tendency to decompose, and in the decomposed condition will attack metal.

Other liquids or substances may be mixed with the methyl chlorid and the methyl bromid such as coloring agents or odors.

What I claim is:—

1. A non-flammable volatile liquid consisting of a mixture of methyl chlorid with methyl bromid.

2. A liquid refrigerating agent comprising a mixture in which methyl chlorid and methyl bromid predominate.

In witness whereof I have hereunto set my hand in presence of two witnesses.

ALBERT HENNING.

Witnesses:
  FLORENCE GILBERT,
  RICHARD CHARLES DENINGTON.